United States Patent
Greenbaum et al.

(10) Patent No.: US 10,891,285 B2
(45) Date of Patent: Jan. 12, 2021

(54) FACTOR BINDING DATA COORDINATION ACROSS MULTIPLE DOMAINS

(71) Applicant: ADP, LLC, Roseland, NJ (US)

(72) Inventors: Adam Greenbaum, New York, NY (US); Sharren Bates, New Hope, PA (US); Jason Lovelace, New York, NY (US); Abed K. Shelbayeh, New York, NY (US); Mark Milman, Demarest, NJ (US); Amit Maimon, New York, NY (US); Chintan Patel, Mahwah, NJ (US); Martin J. Wilson, Denville, NJ (US); Richard B. Noad, Montclair, NJ (US)

(73) Assignee: ADP, LLC, Roseland, NJ (US)

( * ) Notice: Subject to any disclaimer, the term of this patent is extended or adjusted under 35 U.S.C. 154(b) by 154 days.

(21) Appl. No.: 15/787,752

(22) Filed: Oct. 19, 2017

(65) Prior Publication Data
US 2019/0121881 A1 Apr. 25, 2019

(51) Int. Cl.
*G06F 16/23* (2019.01)
*G06Q 40/00* (2012.01)
*G06F 16/27* (2019.01)

(52) U.S. Cl.
CPC ...... *G06F 16/2365* (2019.01); *G06F 16/2358* (2019.01); *G06F 16/27* (2019.01); *G06Q 40/125* (2013.12)

(58) Field of Classification Search
None
See application file for complete search history.

(56) References Cited

U.S. PATENT DOCUMENTS

| | | | |
|---|---|---|---|
| 9,092,280 B2 | 7/2015 | Hu | |
| 9,268,454 B2 | 2/2016 | Hamilton, II et al. | |
| 10,158,677 B1* | 12/2018 | DiCorpo | H04L 51/12 |
| 2004/0030566 A1 | 2/2004 | Brooks | |
| 2007/0233539 A1 | 10/2007 | Suenderhauf et al. | |
| 2009/0171716 A1 | 7/2009 | Suenderhauf et al. | |
| 2010/0100427 A1* | 4/2010 | McKeown | G06Q 10/1057 705/322 |
| 2014/0074540 A1* | 3/2014 | Evans | H04L 67/10 705/7.25 |
| 2015/0365301 A1* | 12/2015 | Chatterjee | H04L 47/808 709/226 |
| 2018/0332138 A1* | 11/2018 | Liu | H04L 41/5041 |
| 2019/0057401 A1* | 2/2019 | Subramanya | G06F 16/332 |

(Continued)

OTHER PUBLICATIONS

"5 Benefits of Having ERP and HCM in a Single Cloud Platform", Oracle, Copyright 2015, 5 pages.

*Primary Examiner* — Kim T Nguyen
(74) *Attorney, Agent, or Firm* — Yee & Associates, P.C.

(57) ABSTRACT

A computer-implemented method, system and computer program product are used to provide a factor in a first domain for a first set of data and in a second domain for a second set of data. The computer-implemented method, system and computer program product then determine a relationship between the domains in term of the factor. The computer-implemented method, system and computer program product determine for the first domain whether the factor from the second domain has changed, and if so, create domain specific records for the first domain in response to determining that the factor from the second domain has changed.

21 Claims, 8 Drawing Sheets

(56) References Cited

U.S. PATENT DOCUMENTS

2019/0102462 A1* 4/2019 Botea .................. H04L 67/10
2019/0121881 A1* 4/2019 Greenbaum ........ G06F 16/2358
2019/0213556 A1* 7/2019 Mondal .............. G06Q 10/1053

* cited by examiner

400

| SYSTEM FACTORS | |
|---|---|
| HCM DOMAIN(S) | FACTOR(S) |
| COMPENSATION | ANNUAL SALARY |
| SALARIED-PAYROLL | PAYROLL SALARY |
| TIME-OFF-VACATION | VACATION HOURS |
| TIME-OFF-PAYROLL | PAID TIME OFF |
| TIME-OFF-ACCRUAL | VACATION ACCRUAL TAKEN |
| TIME | REGULAR HOURS WORKED |
| HOURLY-PAYROLL | PAYROLL HR |

410 — HCM DOMAIN(S); 450 — FACTOR(S); 415/455 — COMPENSATION / ANNUAL SALARY; 420/460 — SALARIED-PAYROLL / PAYROLL SALARY; 425/465 — TIME-OFF-VACATION / VACATION HOURS; 430/470 — TIME-OFF-PAYROLL / PAID TIME OFF; 435/475 — TIME-OFF-ACCRUAL / VACATION ACCRUAL TAKEN; 440/480 — TIME / REGULAR HOURS WORKED; 445/485 — HOURLY-PAYROLL / PAYROLL HR

| CLIENT FACTORS | |
|---|---|
| NAME(S) | ASSOCIATED SYSTEM FACTOR(S) |
| SALARY | COMPENSATION/ANNUAL SALARY — 535<br>SALARIED-PAYROLL/PAYROLL SALARY — 540 |
| VACATION HOURS | TIME-OFF-VACATION/VACATION HOURS — 545<br>TIME-OFF-PAYROLL/PAID TIME OFF (HOURS) — 550<br>TIME-OFF-ACCRUAL/VACATION ACCRUAL TAKEN — 555 |
| HOURLY SALARY | TIME/REGULAR HOURS WORKED — 560<br>HOURLY-PAYROLL/PAYROLL HR — 565 |

510 — NAME(S); 530 — ASSOCIATED SYSTEM FACTOR(S); 515 — SALARY; 520 — VACATION HOURS; 525 — HOURLY SALARY

FIG. 5

| ID | CLIENT FACTOR 610 | SYSTEM FACTOR 615 | ACTUAL DATA ENTERED BY CLIENT 620 | | START DATE 630 | END DATE 635 | GROUP KEY 640 |
|---|---|---|---|---|---|---|---|
| | | | EMPLOYEE(S) | AMOUNT 625 | | | |
| 1 | VACATION HOURS | TIME-OFF-VACATION/ VACATION HOURS | MIKE | 8 | JUNE 1, 2017 | JUNE 1, 2017 | 123 |
| 2 | VACATION HOURS | TIME-OFF-VACATION/ VACATION HOURS | MIKE | 4 | JUNE 2, 2017 | JUNE 2, 2017 | ABC |
| 3 | VACATION HOURS | TIME-OFF-PAYROLL/ PAID TIME OFF (HOURS) | MIKE | 8 | JUNE 1, 2017 | JUNE 1, 2017 | 123 |
| 4 | VACATION HOURS | TIME-OFF-PAYROLL/ PAID TIME OFF (HOURS) | MIKE | 4 | JUNE 2, 2017 | JUNE 2, 2017 | ABC |
| 5 | VACATION HOURS | TIME-OFF-ACCRUAL/ VACATION ACCRUAL TAKEN | MIKE | 8 | JUNE 1, 2017 | JUNE 1, 2017 | 123 |
| 6 | VACATION HOURS | TIME-OFF-ACCRUAL/ VACATION ACCRUAL TAKEN | MIKE | -4 | JUNE 2, 2017 | JUNE 2, 2017 | ABC |

FIG. 6b

FACTOR BINDING DATA COORDINATION ACROSS MULTIPLE DOMAINS

BACKGROUND

1. Field

The present disclosure relates generally to database management system, and more particularly, to a computer-implemented method, system and computer program product for coordinating data across human capital management (HCM) domains, such that data therein is correlated, which allows for efficient management and record validation among the domains.

2. Description of the Related Art

Human capital management (HCM) is a form of human resources (HR) management that considers people as assets (i.e., human capital). As assets, people have a current value and a future value. The current value can of course be measured. However, future value can only be speculated about. Nonetheless, having a desired goal in mind, human capital may be nurtured to achieve the desired goal through investment and/or management.

There are presently companies that provide HCM services that enable employers to not only measure the current value of their personnel, but also nurture the personnel. These services include recruiting (i.e., workforce planning, hiring and recruitment), HR, benefits, performance (i.e., competency management, performance management), compensation (i.e., compensation planning and strategy), scheduling (time and expense management), leave/absence, and payroll, among other suitable types of services.

To provide these services, however, these companies have to collect data in each of the service areas (i.e., HCM domains). But, as can be surmised from the previous paragraph, data residing in one service area or HCM domain may be relevant to one or more other domains. For example, data representing time worked by an hourly-paid employee may reside in the "payroll" domain but also be relevant to the "leave/absence" domain and/or the "benefits" domain etc. In such cases, an employer should not have to go through the inconvenience of providing the data more than once. Specifically, when data in one domain is correlated to data in other domains, a data update in one domain should permeate to the other domains. This may allow for more efficient management as well as record validation among the domains.

Thus, there is a need for an improvement to an information handling system that may be used to collect data from clients with the least amount of inconvenience to the clients and that will allow for record validation, flexible as well as efficient data correlation across domains.

SUMMARY

The present disclosure provides a computer-implemented method, system and computer program product that define a factor in a first domain for a first set of data and in a second domain for a second set of data. The computer-implemented method, system and computer program product then determine a relationship between the first and second domains in term of the factor. The computer-implemented method, system and computer program product determine for the first domain whether the factor from the second domain has changed, and if so, create domain specific records for the first domain in response to determining that the factor from the second domain has changed.

In this particular embodiment, the domain specific records are based on the factor being changed in the second domain. In another embodiment, the determination as to whether a factor from the second domain has changed includes listening, by the first domain, onto events for such a change from the second domain. The determination as to whether the factor from the second domain has changed may occur through a request from the first domain for such a change to the second domain or from the second domain notifying the first domain of such a change.

In any event, by the computer-implemented method, system and computer program product creating domain specific records based on the change, each domain may continue to host domain specific data such that the data is correlated across all the domains allowing for record validation among the domains and efficient benchmarking. In such a case, a domain may be a service being provided by a service provider, such as a human capital management (HCM) company.

BRIEF DESCRIPTION OF THE DRAWINGS

FIG. 1 depicts a pictorial representation of a network of data processing systems in which the present invention may be implemented;

FIG. 4 depicts a list of services that an HCM company may have been contracted to provide to an employer in accordance with an embodiment of the present invention;

FIG. 5 depicts binding factors that are associated with the list of services (or domains) in accordance with an embodiment of the present invention;

FIG. 6*a*-6*b* depict data that may be entered by an employer to enable the HCM company to provide the contracted services in accordance with an embodiment of the present invention;

DETAILED DESCRIPTION

The present invention provides an improvement to an information handling system that is used by a human capital management (HCM) company to collect data in the least burdensome manner from clients of the HCM company. One such improvement includes having a client enter data only once in cases where the data is used to provide more than one service to the client. Another such improvement includes not requiring the client to enter data that may be derived from data that has already been provided. In all cases, however, the improved information handling system correlates the data in all the different domains in such a way that each domain continues to host domain specific data. The data correlation allows for record validation among the domains and efficient benchmarking.

Figures 1, 6A:
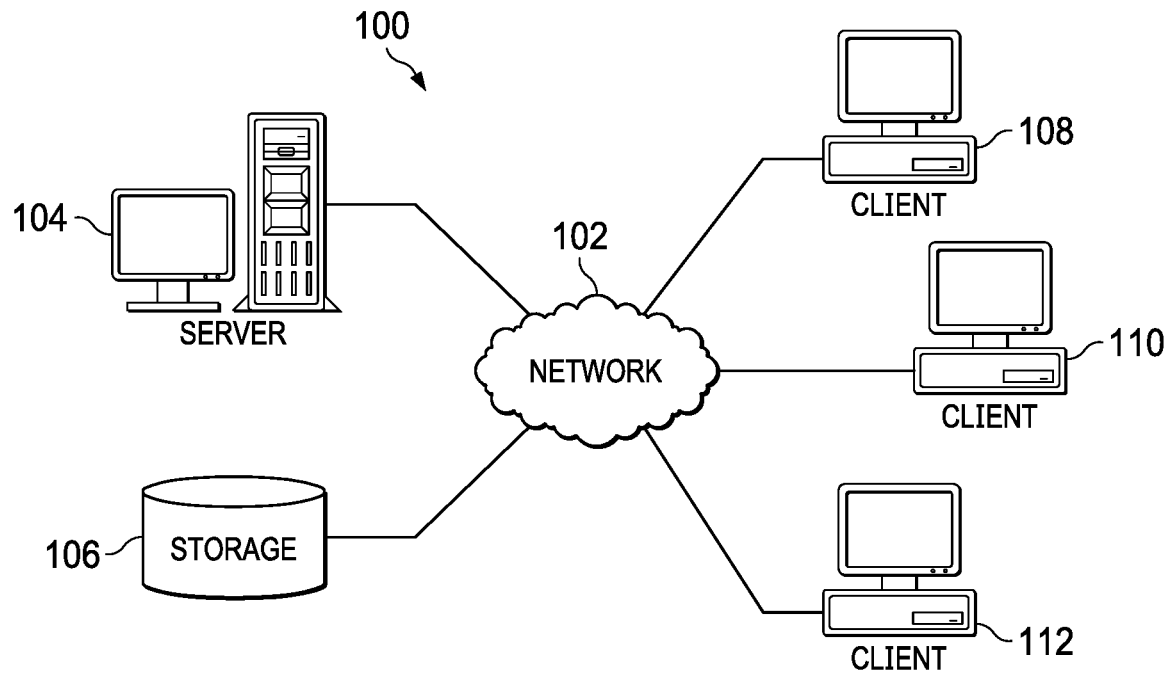

With reference now to the figures, FIG. 1 depicts a pictorial representation of a network of information handling systems (or data processing systems) in which the present invention may be implemented. Network data processing system 100 is a network of computers that contains network 102, which is the medium used to provide communications links between various devices and computers connected together within network data processing system 100. Network 102 may include connections, such as wire, wireless communication links, fiber optic cables, or other suitable types of connections.

In the depicted example, server 104 is connected to network 102 along with storage unit 106. In addition, clients 108, 110, and 112 are connected to network 102. Clients 108, 110, and 112 may be, for example, personal computers or network computers. In the depicted example, server 104 may provide data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet, is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
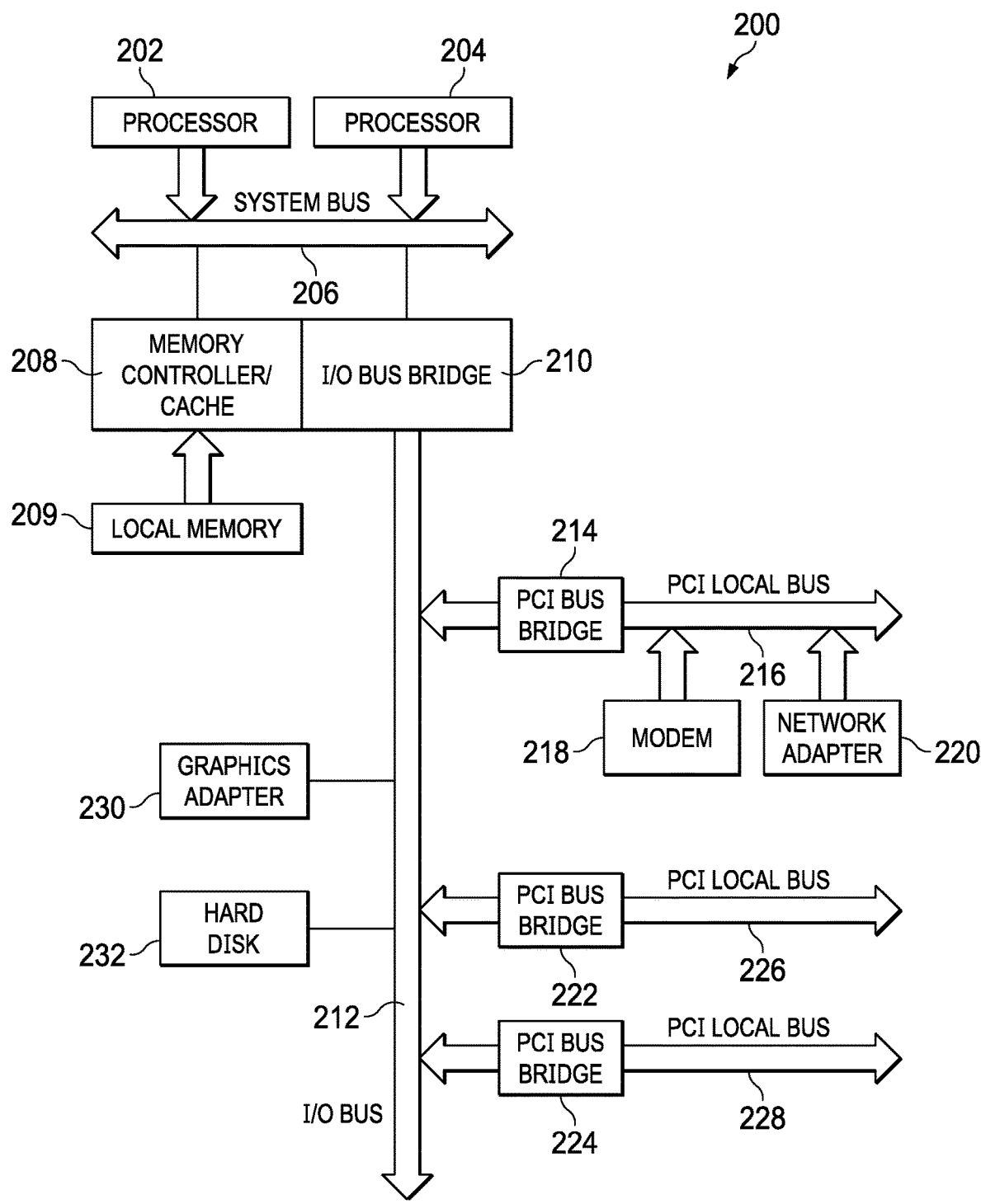
FIG. 2 depicts a block diagram of a data processing system that may be implemented as a server, which in a preferred embodiment of the present invention may be used to help employers find, hire and manage human talent.

Referring to FIG. 2, a block diagram of a data processing system that may be implemented as a server, which in a preferred embodiment of the present invention may be used to help employers find, hire and manage talent. Data processing system 200 may be a symmetric multiprocessor (SMP) system including a plurality of processors, including processor 202 and processor 204 connected to system bus 206. Alternatively, more than one or a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated, as depicted.

Peripheral component interconnect (PCI) bus bridge 214, connected to I/O bus 212, provides an interface to PCI local bus 216. A number of modems may be connected to PCI local bus 216. Typical PCI bus implementations will support four PCI expansion slots or add-in connectors. Communications links to server 104, shown in FIG. 1, or to other computer systems (not shown) in FIG. 1 may be provided through modem 218 and network adapter 220 connected to PCI local bus 216 through add-in boards.

Additional PCI bus bridges, such as PCI bus bridge 222 and PCI bus bridge 224, provide interfaces for additional PCI local bus 226 and PCI local bus 228, from which additional modems or network adapters may be supported. In this manner, data processing system 200 allows connections to multiple computer systems. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives, universal serial bus (USB) drives and the like, also may be used, in addition to or in place of, the hardware depicted. Thus, the depicted example is not meant to imply architectural limitations.

Figure 3:
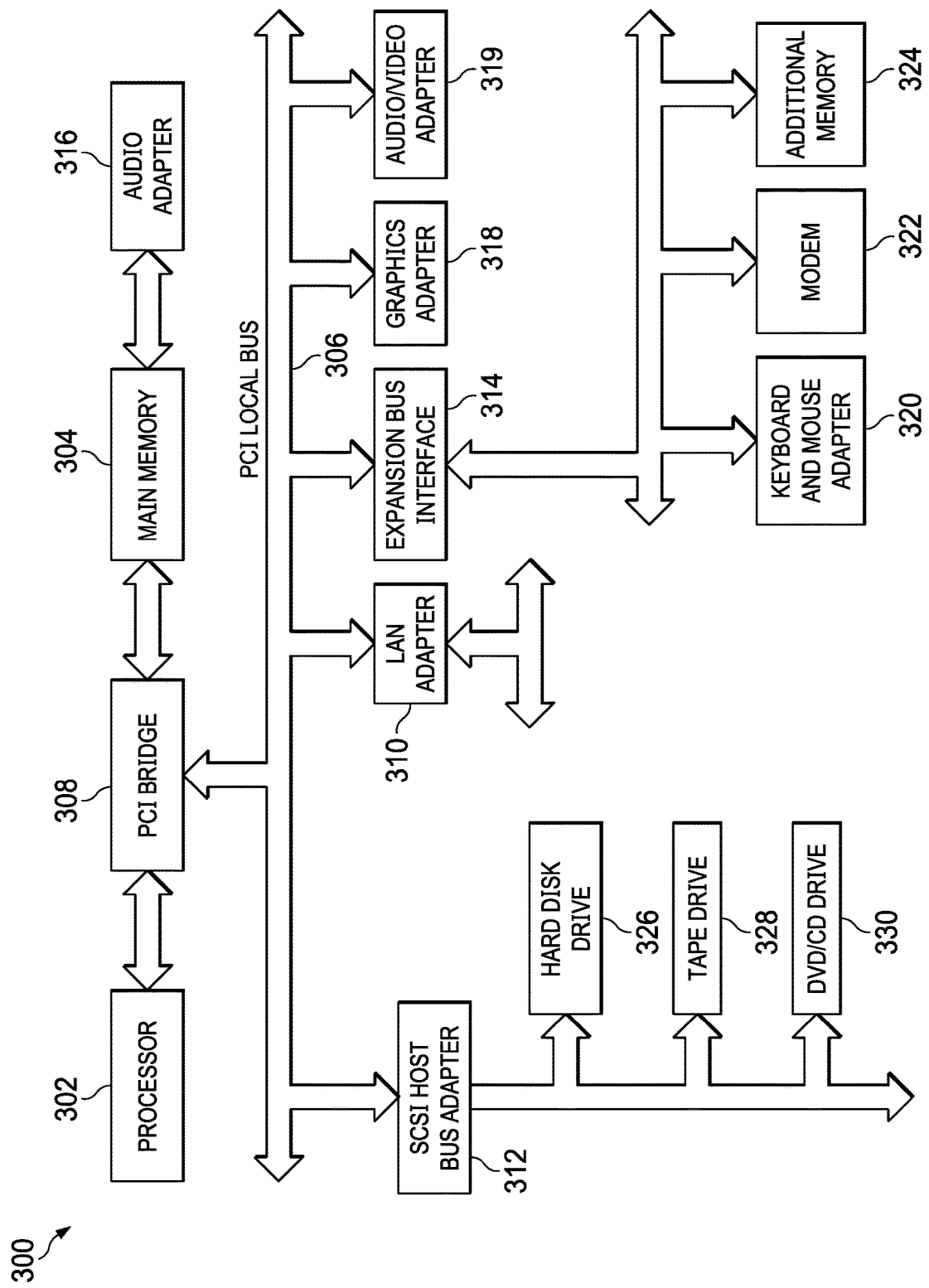
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer, such as client 108, 110 or 112 of FIG. 1. Data processing system 300 employs a peripheral component interconnect (PCI) local bus architecture. Although the depicted example employs a PCI bus, other bus architectures such as accelerated graphics port (AGP) and industry standard architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for keyboard and mouse adapter 320, modem 322, and additional memory 324. Small computer system interface (SCSI) host bus adapter 312 provides a connection for hard disk drive 326, tape drive 328, and DVD/CD drive 330. Typical PCI local bus implementations will support three or four PCI expansion slots or add-in connectors.

An operating system runs on processor 302 and is used to coordinate and provide control of various components within data processing system 300 in FIG. 3. The operating system may be an open source operating system, such as Linux, or a Microsoft Windows® operating system or the like. Microsoft Windows® is a trademark of the Microsoft Corporation. An object oriented programming system, such as Java, may run in conjunction with the operating system and provide calls to the operating system from Java programs or applications executing on data processing system 300. Java is a trademark of Sun Microsystems, Incorporated. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary, depending on the implementation. Other internal hardware or peripheral devices, such as flash ROM (or an equivalent nonvolatile memory) or optical disk drives, USB drives and the like, may be used in addition to or in place of the hardware depicted in FIG. 3. Also, the processes of the present disclosure may be applied to a multiprocessor data processing system.

The depicted example in FIG. 3 and the above-described examples are not meant to imply architectural limitations. For example, data processing system 300 may also be a mobile device such as a personal digital assistant (PDA)

device, a cellular telephone, a tablet, a notebook, a laptop and other suitable types of devices. Data processing system 300 also may be a kiosk or a Web appliance.

With the advent of cloud-based computing, companies that provide human capital management (HCM) services to employers may do so remotely. As an example, an employer that needs certain HCM services may contract with an HCM company for those services. Thus, a representative of the employer may, on a periodic basis, enter data, such as, for example, time worked by an hourly-paid employee or compensation of a salaried employee or other types of data, through a Web portal of the HCM company into a database system. In such a scenario, server 104 in FIG. 1 may represent the HCM company and one of clients 108, 110, and 112, shown in FIG. 1, may represent the employer.

As is well known in the field of database management systems, there are two types of database systems: relational and non-relational. In a relational database management system, data relationships are predefined in a schema and data is placed in specific tables that are linked to other tables through keys. In a non-relational database management system, the database is used as a file system storing records with no predefined relationships.

In accordance with the present invention, factors are used to dynamically relate data between two or more HCM domains. Further, a relationship may also be defined between any two or more HCM domains. Thus, a factor may or may not be defined to be common to all domains. In addition, a factor may be defined as being common to two domains or may be defined for one domain then defined dynamically for other domains any time thereafter. As is obvious, data for multiple clients may be in the database. Hence, a factor may be client-based, where the factor is defined for a subset of data. For example, a company may have a unique bonus calculation based on performance ratings. A factor may also be shared by multiple clients. As an example, multiple companies may share the same relationship between overtime hours and overtime pay (e.g., overtime pay=overtime hours×1.5 times regular hourly salary).

Accordingly, one of the novel aspects of the database system is that both the factors and the relationship between the factors can be dynamically defined. Another aspect is that a factor and the relationship for the factor can be defined for a subset of data on a per-client basis as well as on an inter-client basis. In addition, unlike data relationships in a relational database where there is a mere linking between data in different domains, the relationship, according to the present invention, can involve simple to complex data conversion from one domain to another. For example, rather than simply linking a performance rating to a bonus, the relationship between the performance rating and the bonus may be defined as follows: "if performance rating=2 and corporate performance=1, then bonus=112% of salary".

In any event, since data relationships are dynamically created using factors, either a relational database system and/or a non-relational database system may be used in conjunction with the present invention.

FIG. 4 depicts a list of services that an HCM company may have been contracted to provide to an employer in accordance with an embodiment of the present invention. System factors table 400 in FIG. 4 includes two columns: HCM domain(s) 410 and factor(s) 450. HCM domain(s) 410 includes a list of services that the HCM company, in this case, has been contracted to provide to the employer. The list includes compensation 415, salaried-payroll 420, time-off-vacation 425, time-off-payroll 430, time-off-accrual 435, time 440 and hourly-payroll 445. For each service in HCM domain(s) 410, there is a corresponding entry in factor(s) 450 that describes the service. For example, compensation 415 in HCM domain(s) 410 has a corresponding entry in factor(s) 450 that explains that the compensation 415 is an annual compensation of a salaried employee or annual salary 455. Likewise, salaried-payroll 420 in HCM domain(s) 410 has a corresponding entry in factor(s) 450 that explains that it is a "per pay period" salary for a salaried employee or payroll salary 460. Time-off-vacation 425 corresponds to accrued vacation hours 465. Time-off-payroll 430 corresponds to paid time off 470. Time-off-accrual 435 corresponds to vacation accrual taken 475. Time 440 corresponds to regular hours worked 480 (by an hourly-paid employee, for example) and hourly-payroll 445 corresponds to payroll HR 485.

FIG. 5 depicts binding factors that are associated with the list of services (or domains) in accordance with an embodiment of the present invention. Client factors table 500 of FIG. 5 is used to bind different domains (or services) in FIG. 4 together. For example, salary 515 in column name(s) 510, which, as will be explained further below, may be what the representative of the employer may enter for a salaried employee, binds compensation 415 to salaried-payroll 420 in HCM domain(s) 410 of FIG. 4. Thus, if compensation 415 ever changes, then salaried-payroll 420 will accordingly change and vice versa. Stated differently, when compensation 415 is changed or updated (e.g., an employee has gotten a raise and hence his/her annual compensation has changed), then salaried-payroll 420 (e.g., his/her monthly salary) will make a record of it and update itself accordingly. Thus, by being bound together, compensation 415 listens for changes in salaried-payroll 420 and vice versa. Alternatively, compensation 415 may, on a periodic basis, query salaried-payroll 420 for changes or notify salaried-payroll 420 of any change that might have occurred in compensation 415 and vice versa.

Binding compensation 415 to salaried-payroll 420 provides some benefits. For example, if compensation 415 were to accidentally be erased, since salaried-payroll 420 has a record of the change in compensation 415, salaried-payroll 420 will know what the monthly pay of the employee should be.

In any event, to show that compensation 415 has been bound to salaried-payroll 420 by salary 515, compensation/annual salary 535 is in the same box as salaried-payroll/payroll salary 540 under column associated system factor(s) 530 in FIG. 5. Likewise, vacation hours 520 binds time-off-vacation 425 to time-off-payroll 430 and to time-off-accrual 435 in domain(s) 410 of FIG. 4. Therefore, time-off-vacation/vacation hours 545, time-off-payroll/paid time off 550 and time-off-accrual/vacation accrual taken 555 are in the same box under column associated system factor(s) 530. Hence, any change in one will elicit a change in the other two. Further, time 440 is bound to hourly-payroll 445 through hourly salary 525 (see time/regular hours worked 560 and hourly-payroll/payroll HR 565).

As mentioned above, to provide data to the HCM company, the employer or one of its representatives has to log onto the Web portal of the HCM company. To enable data entry, table 600a and table 600b (see FIGS. 6a and 6b) may be displayed to the employer or its representative. FIGS. 6a-6b depict data that may be entered by an employer to enable the HCM company to provide the contracted services in accordance with an embodiment of the present invention. Table 600a of FIG. 6a has five columns. The five columns include ID 610, client factor 615, system factor 620, employee(s) 625, and amount 630. Each time the employer enters data onto the table, the system automatically assigns an identification to the entry (see IDs 1, 2, 3 and 4). Rows 650, 651, 652, and 653 represent each an entry into table 600a. In order for the employer to enter data into table 600a, the employer has to indicate the domain (i.e., service) in which data is to be entered. In case of row 650, the employer indicates that the data is to be entered into a client factor by the name of salary. Since client factor salary has already been set in FIG. 5 (see salary 515), the box under system factor 620 is automatically filled in. Further, because salary 515 binds compensation 415 in FIG. 4 to salaried payroll 420, row 651 will automatically be filled in. At this point, the employer may enter the name of the employee (i.e., John) in column(s) 625 as well as John's annual salary ($120,000) in either row 650 or row 651 since as soon as data is entered into one (i.e., compensation) by being bound to the other (i.e., salaried payroll), the other will update itself automatically. Same is true for rows 652 and 653 where the employer is entering a compensation of $80,000 for employee Jeff.

Note that if the employer wanted to update or enter an hourly rate for an employee, the employer would have to enter "hourly salary" in a box under client 615 so that time/regular hours worked and hourly-payroll/payroll HR may automatically be entered each in a different row under system factor 620. As in the case of salary, the employee would then need to enter the name of the employee under employee(s) 625 and the hourly rate under amount 630 in either of the rows in which time/regular hours worked and hourly-payroll/payroll HR are entered.

In table 600b of FIG. 6b, employee Mike who had eight hours of vacation time accumulated on Jun. 1, 2017 (see entries in row 664 under start date 630 and end date 635) is shown to have taken four hours off on Jun. 2, 2017. Therefore, on Jun. 2, 2017 (i.e., row 666) employee Mike's vacation time is being updated to show the vacation accrual time taken. By virtue of time-off-accrual 435 being bound to time-off-vacation 425 and time-off-payroll 430 through client factor vacation hours 520 in FIG. 5, time-off-vacation 425 (see rows 660 and 661) and time-off-payroll 430 (i.e., rows 662 and 663) show also the transactions.

Thus, as shown above, data is coordinated in the different HCM domains such that number of hours worked, for example, which is in the time domain, is used by the payroll domain to determine the amount per period to pay an individual. As is obvious, a simple foreign key relationship in a relational database does not work because the joining of tables across the different domains is not ideal (i.e., presents performance obstacles) and data, although related, may be in different forms in different domains.

Hence, the present invention solves this problem by defining factors and how these factors relate to one another. When data in a factor is changed, data in its related factors, upon listening in on events for such change, creates domain specific records based on the change. For example, "hours worked" is a domain, "compensation" is a different domain. In the "hours worked" domain, there are regular hours and overtime hours, which are both numbers (i.e., domain specific data). When it gets to the "compensation" domain, overtime pay may be defined as follows: overtime pay=overtime hours×1.5 regular hourly rate (a domain specific record). Each domain continues to host domain specific data. Such event driven data creation in different domains correlates data across all domains allowing for record validation among the domains and for efficient benchmarking.

Figure 7:
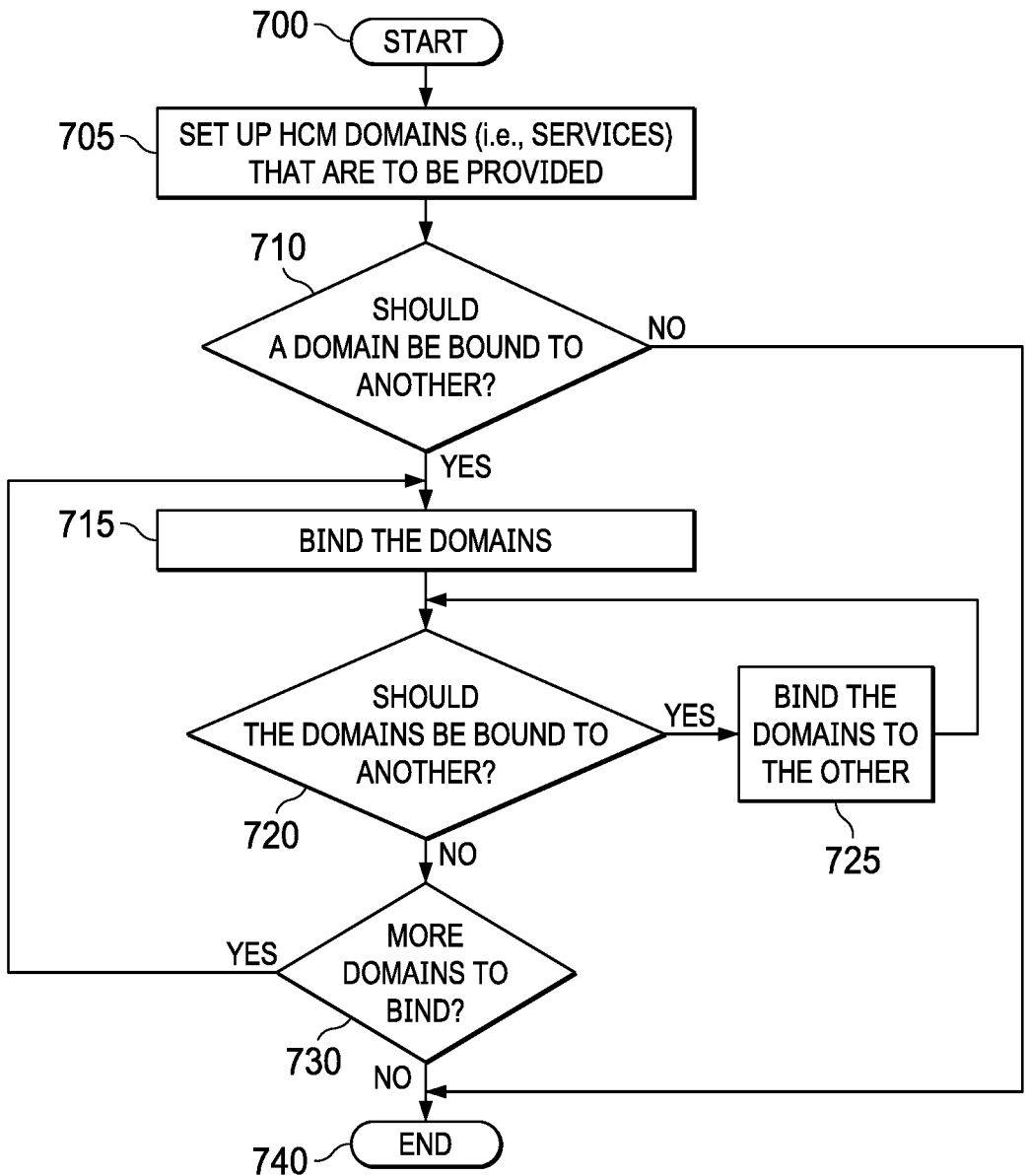
FIG. 7 is a flowchart of a process that may be used by an HCM company to provide services, in accordance with the present invention.

FIG. 7 is a flowchart of a process that may be used by an HCM company to provide services, in accordance with the present invention. The process starts after a company/employer has entered into a service contract with the HCM company (block 700). After the contract is entered into, the HCM company may set up the HCM domains (i.e., services) that are to be provided (block 705) as shown in FIG. 4. Upon setting up the services, a check may be made to determine whether any of the domains (i.e., the services) should be bound to another domain (block 710). If so, the domains are bound together (block 715) as shown in FIG. 5. If not then, the process terminates (block 740). Returning to block 715, after binding the domains, a check may be made to determine if the bound domains are to be bound to another domain (block 720). If so, the domains are bound to the other domain and the process returns to block 720 to determine whether to bind the bound domains to another domain. If the domains are not to be bound to another domain, then a check is made as to whether more domains (i.e., different domains from the ones that have already been bound together) are to be bound together (block 730). If so, the process returns to block 715 where the domains are bound to each other. If not, then the process terminates at block 740.

Figure 8:
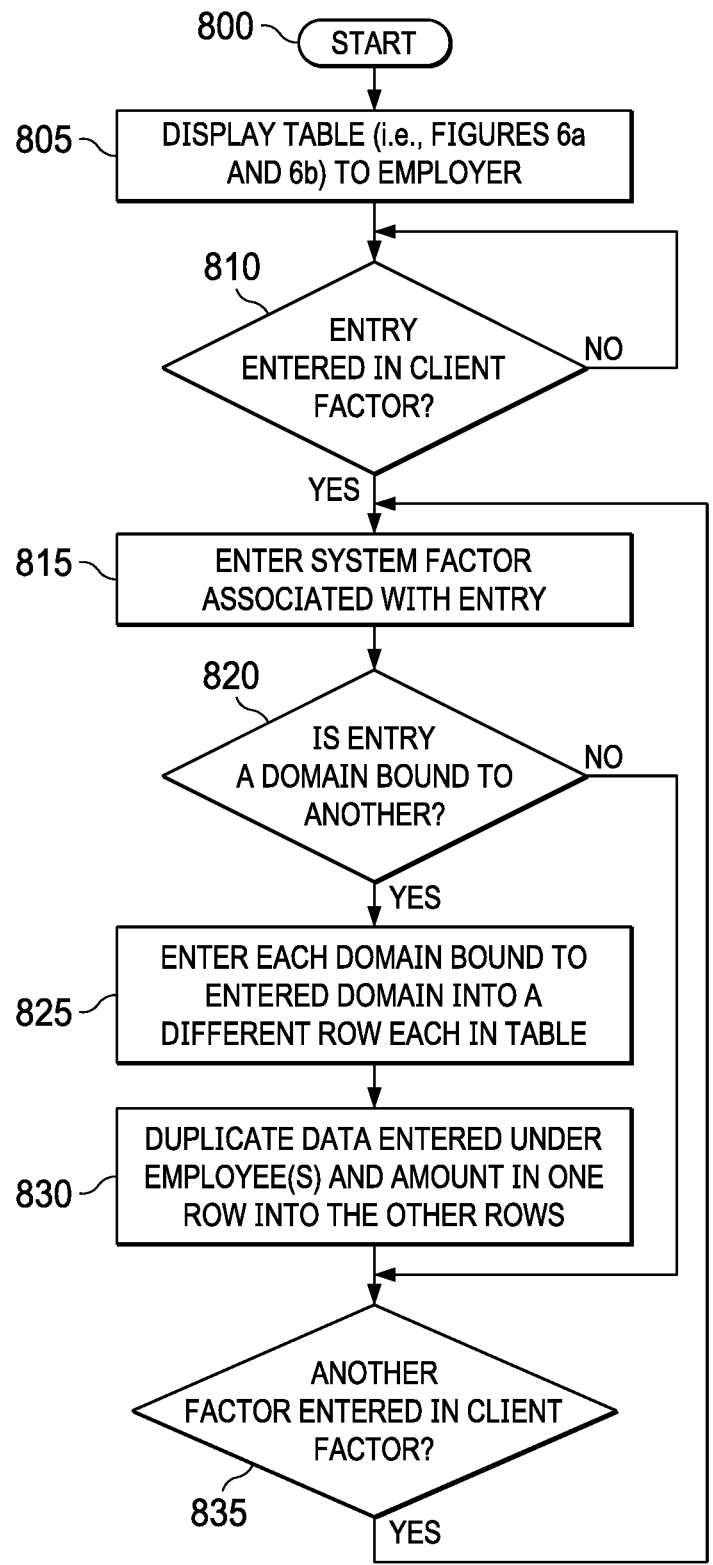
FIG. 8 is a flowchart of a process that may be used to enable an employer to enter data that is needed for an HCM company to provide services contracted by the employer, in accordance with the present invention.

FIG. 8 is a flowchart of a process that may be used to enable an employer to enter data that is needed for an HCM company to provide services contracted by the employer, in accordance with the present invention. The process starts when the employer logs onto the Web portal of the HCM company (block 800). Once started, the process displays table 6a of FIG. 6a or table 6b of FIG. 6b (block 805). Then a check is continually made to determine whether the employer has made an entry into the client factor (block 810). When the employer has done so, the system factor associated with the entry is entered (block 815). Then a check is made to determine whether the entry is a domain bound to at least one other domain (block 820). If so, each domain that is bound to the entered domain is entered into a row in table 6a of FIG. 6a, for example (block 825). After doing so, any data entered by the employer under employee(s) 625 and amount 630 in one row is duplicated into the other rows (block 830). Then another check is made to determine whether another factor is entered into the client factor (block 835). If so, the process goes back to block 815. If the result of the check at block 820 is a "no" then the process proceeds to block 835. The process ends when the employer logs out of the Web portal.

Figure 9:
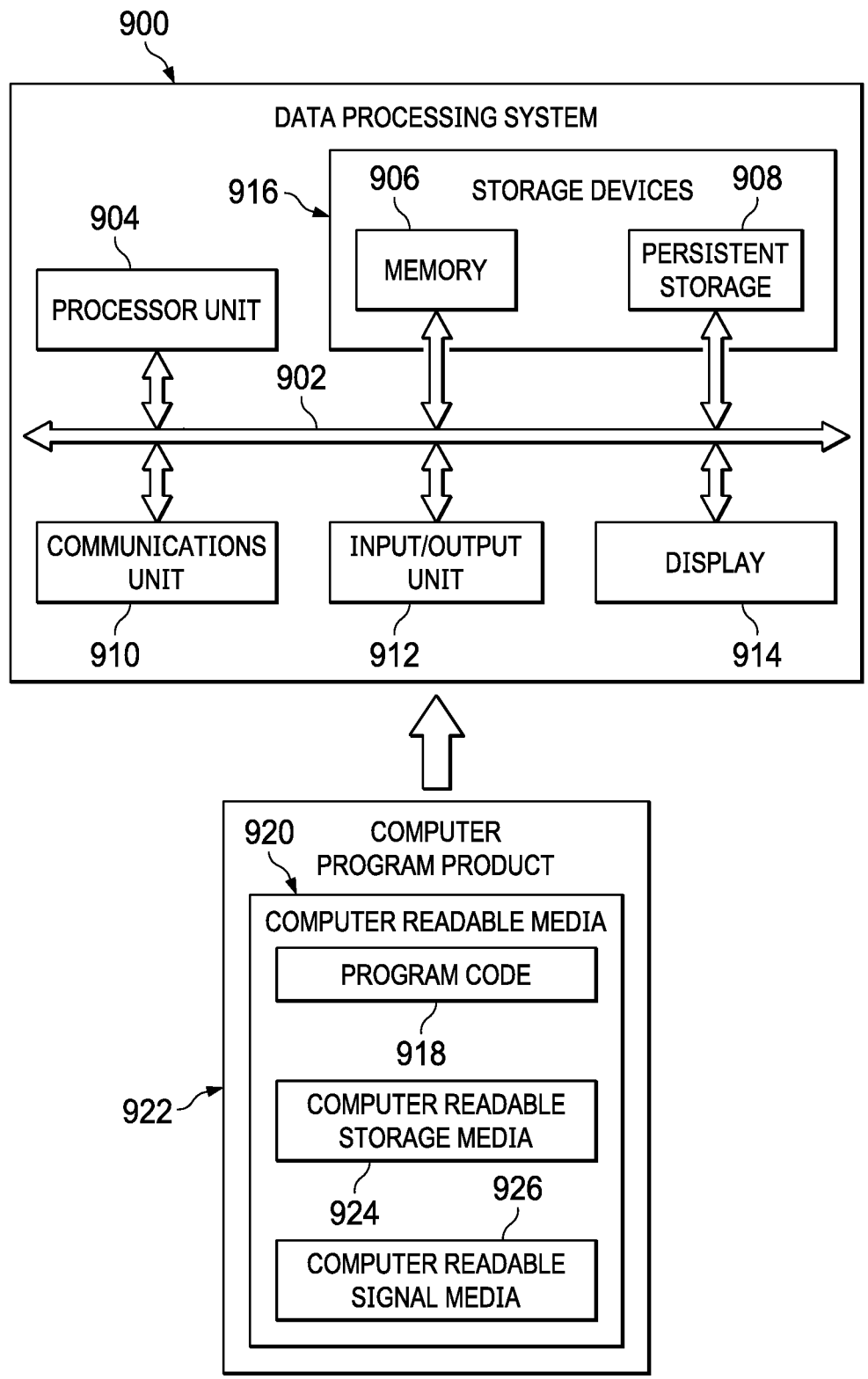
FIG. 9 is an illustration of a block diagram of a data processing system in accordance with the present invention.

Turning now to FIG. 9, an illustration of a block diagram of a data processing system is depicted in accordance with an illustrative embodiment. Data processing system 900 is a more specific implementation of client 108, 110 or 112 in FIG. 1. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918. Alternatively, program code 918 may be transferred to data processing system 900 using computer readable signal media 926. Computer readable signal media 926 may be, for example, a propagated data signal containing program code 918. For example, computer readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
receiving input data for a factor through a user interface, wherein the factor binds two or more domains of human capital management services;
identifying a first domain for a first set of data for a first human capital management service, wherein the first domain is associated with the factor;
identifying a second domain for a second set of data for a second human capital management service, wherein the second domain is bound to the first domain by the factor, and wherein a relationship between the first domain and the second domain is dynamically defined in terms of the factor;
determining by the second domain whether the first set of data in the first domain has changed as a result of the input for the factor; and
creating a domain specific record by the second domain that automatically updates the second set of data, according to the relationship between the first domain and second domain, in response to determining that the first set of data in the first domain has changed,
wherein determining by the second domain whether the factor from the first domain has changed includes issuing a request, by the second domain, for such a change from the first domain.

2. The method of claim 1, wherein the domain specific record is based on the factor being changed.

3. The method of claim 2, wherein creating the domain specific record by the second domain creates a record validation between the first domain and the second domain.

4. The method of claim 1, wherein determining by the second domain whether the factor from the first domain has changed includes listening, by the second domain, onto events for such a change from the first domain.

5. The method of claim 1, wherein determining, by the second domain, whether the factor from the first domain has changed includes receiving, by the second domain, a notification that such a change occurred from the first domain.

6. The method of claim 1, wherein each domain continues to host domain specific data.

7. The method of claim 1, wherein the factor is specific to a client of the human capital services.

8. A computing system comprising:
at least one storage system for storing program code; and
at least one processor for processing the program code to:
receive input data for a factor through a user interface, wherein the factor binds two or more domains of human capital management services;
identify a first domain for a first set of data for a first human capital management service, wherein the first domain is associated with the factor;
identify a second domain for a second set of data for a second human capital management service, wherein the second domain is bound to the first domain by the factor, and wherein a relationship between the first domain and the second domain is dynamically defined in terms of the factor;
determine by the second domain whether the first set of data in the first domain has changed as a result of the input for the factor; and
create a domain specific record by the second domain that automatically updates the second set of data, according to the relationship between the first domain and second domain in response to determining that the first set of data in the first domain has changed,
wherein determine by the second domain whether the factor from the first domain has changed includes requesting, by the second domain, whether there is such a change from the first domain.

9. The computing system of claim 8, wherein the domain specific records are based on the factor being changed in the second domain.

10. The computing system of claim 9, wherein creating the domain specific records by the first domain based on the factor being changed in the second domain creates a record validation between the first domain and the second domain.

11. The computing system of claim 8, wherein determining, by the second domain, whether the factor from the first domain has changed includes listening, by the second domain, onto events for such a change from the first domain.

12. The computing system of claim 8, wherein determining, by the second domain, whether the factor from the first domain has changed includes receiving, by the second domain, a notification that such a change occurred from the first domain.

13. The computing system of claim 8, wherein each domain continues to host domain specific data.

14. The computing system of claim 8, wherein the factor is specific to a client of the human capital services.

15. A computer program product comprising:
a computer-readable storage media including instructions embodied thereon to perform the steps of:
receiving input data for a factor through a user interface, wherein the factor binds two or more domains of human capital management services;
identifying a first domain for a first set of data for a first human capital management service, wherein the first domain is associated with the factor;
identifying a second domain for a second set of data for a second human capital management service, wherein the second domain is bound to the first domain by the factor, and wherein a relationship between the first domain and the second domain is dynamically defined in terms of the factor;
determining by the second domain whether the first set of data in the first domain has changed as a result of the input for the factor; and
creating a domain specific record by the second domain that automatically updates the second set of data, according to the relationship between the first domain and second domain in response to determining that the first set of data in the first domain has changed,
wherein determining by the second domain whether the factor from the first domain has changed includes requesting, by the second domain, whether there is such a change from the first domain.

16. The computer program product of claim 15, wherein the domain specific records are based on the factor being changed in the second domain.

17. The computer program product of claim 16, wherein creating the domain specific records by the first domain based on the factor being changed in the second domain creates a record validation between the first domain and the second domain.

18. The computer program product of claim 15, wherein determining, by the second domain, whether the factor from the first domain has changed includes listening, by the second domain, onto events for such a change from the first domain.

19. The computer program product of claim 15, wherein determining, by the second domain, whether the factor from the first domain has changed includes receiving, by the second domain, notification that such a change occurred from the first domain.

20. The computer program product of claim 15, wherein each domain continues to host domain specific data.

21. The computer program product of claim 15, wherein the factor is specific to a client of the human capital services.

* * * * *